Oct. 29, 1968             R. D. RESCH             3,407,558
SELF-SUPPORTING STRUCTURAL UNIT HAVING A SERIES OF
REPETITIOUS GEOMETRICAL MODULES
Filed Jan. 24, 1966                                    5 Sheets-Sheet 1
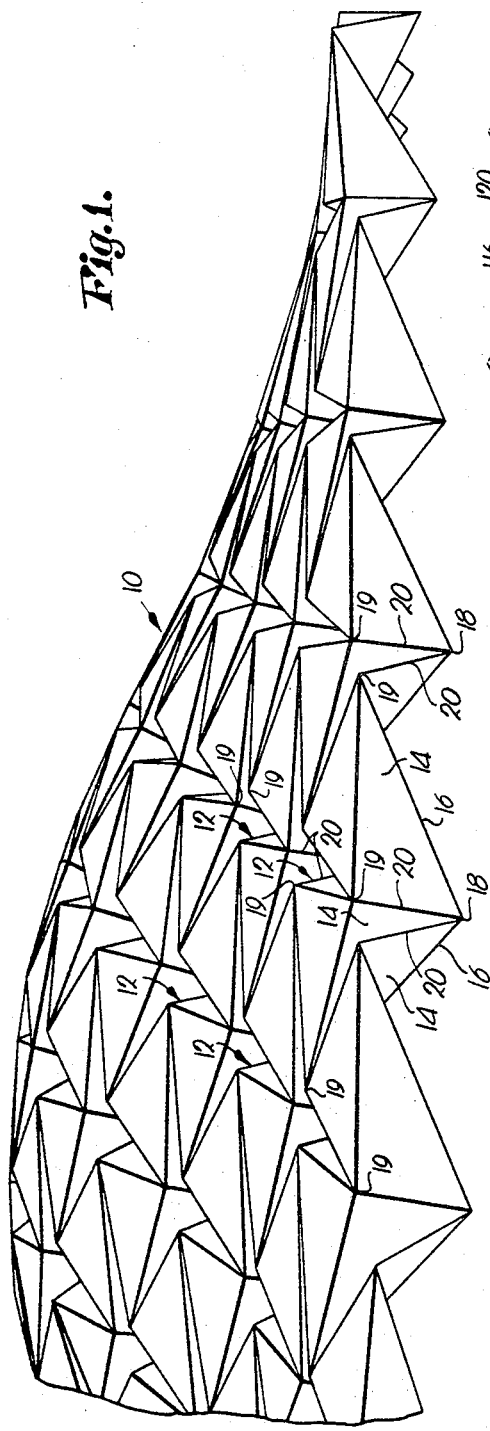
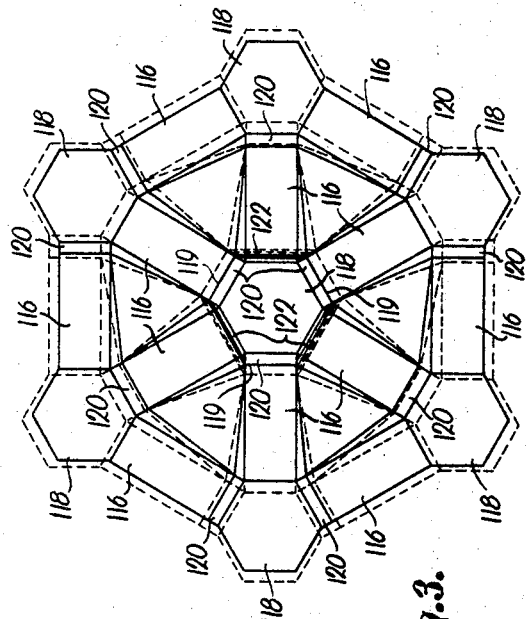
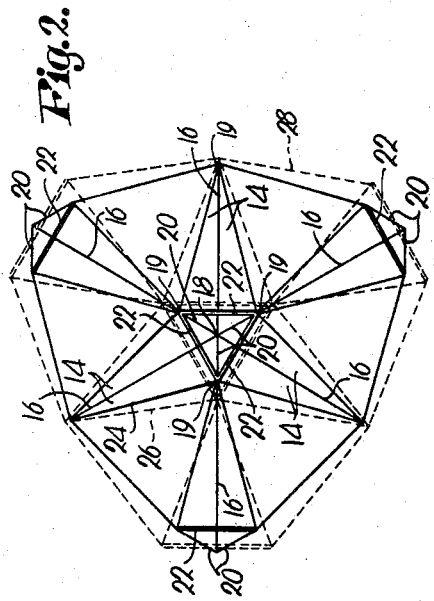
INVENTOR.
Ronald D. Resch
BY
Hovey, Schmidt, Johnson & Hovey
ATTORNEYS.

Oct. 29, 1968 R. D. RESCH 3,407,558
SELF-SUPPORTING STRUCTURAL UNIT HAVING A SERIES OF
REPETITIOUS GEOMETRICAL MODULES
Filed Jan. 24, 1966 5 Sheets-Sheet 2
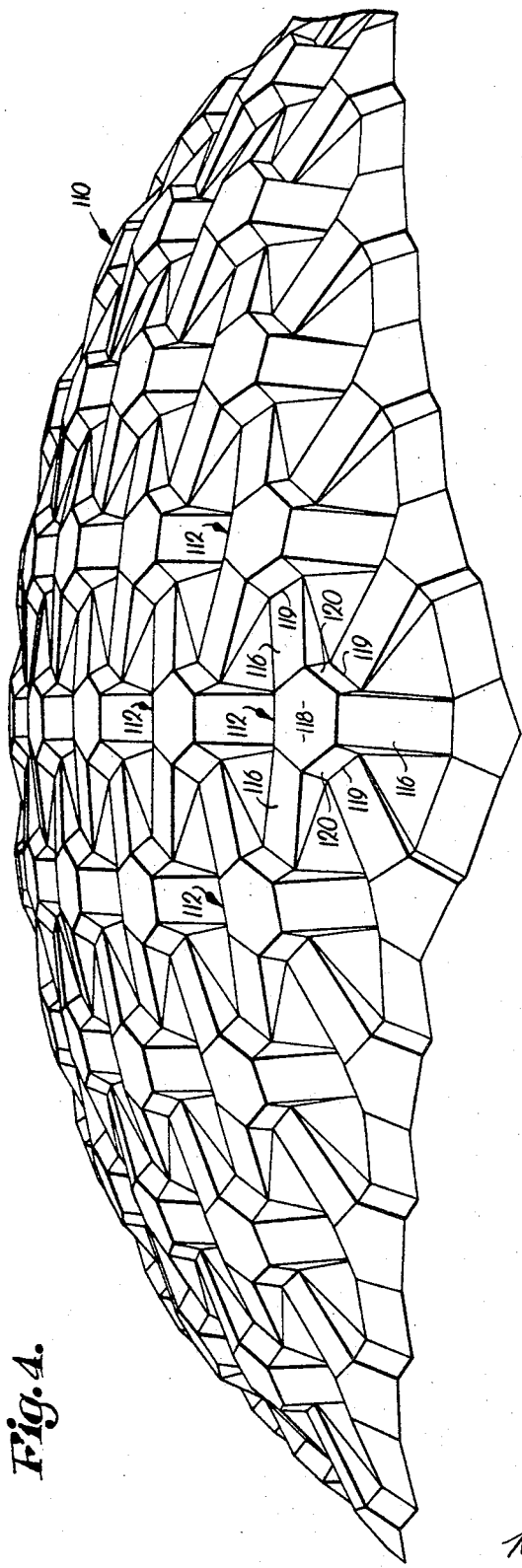
Fig. 4.
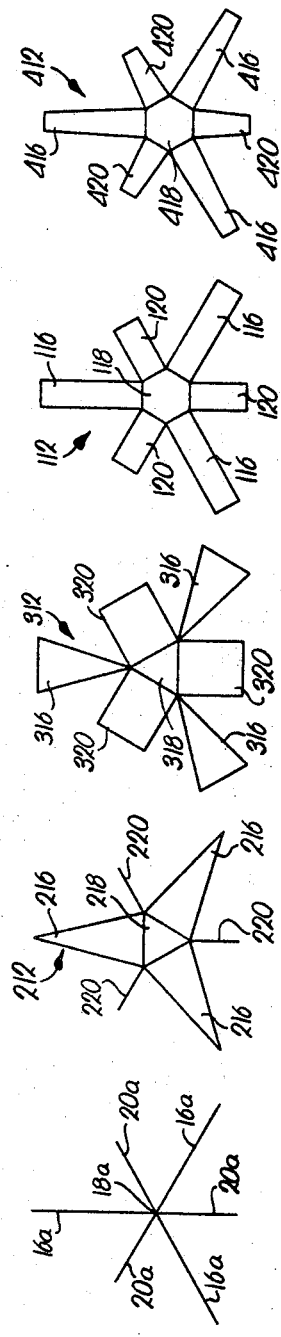
Fig. 9.
Fig. 8.
Fig. 7.
Fig. 6.
Fig. 5.
INVENTOR.
Ronald D. Resch
BY
Hovey, Schmidt, Johnson & Hovey
ATTORNEYS.

Oct. 29, 1968  R. D. RESCH  3,407,558
SELF-SUPPORTING STRUCTURAL UNIT HAVING A SERIES OF
REPETITIOUS GEOMETRICAL MODULES
Filed Jan. 24, 1966  5 Sheets-Sheet 3

INVENTOR.
Ronald D. Resch
BY
Hovey, Schmidt, Johnson & Hovey
ATTORNEYS.

Oct. 29, 1968    R. D. RESCH    3,407,558
SELF-SUPPORTING STRUCTURAL UNIT HAVING A SERIES OF
REPETITIOUS GEOMETRICAL MODULES
Filed Jan. 24, 1966    5 Sheets-Sheet 4

INVENTOR.
Ronald D. Resch

BY

*Hovey, Schmidt, Johnson & Hovey*
ATTORNEYS.

Oct. 29, 1968    R. D. RESCH    3,407,558
SELF-SUPPORTING STRUCTURAL UNIT HAVING A SERIES OF
REPETITIOUS GEOMETRICAL MODULES
Filed Jan. 24, 1966    5 Sheets-Sheet 5

INVENTOR.
Ronald D. Resch
BY
Hovey, Schmidt, Johnson & Hovey
ATTORNEYS.

United States Patent Office 3,407,558
Patented Oct. 29, 1968

3,407,558
SELF-SUPPORTING STRUCTURAL UNIT HAVING A SERIES OF REPETITIOUS GEOMETRICAL MODULES
Ronald D. Resch, Independence, Mo.
(R.R. 3, Rising Road, Champaign, Ill. 61820)
Filed Jan. 24, 1966, Ser. No. 522,482
27 Claims. (Cl. 52—573)

ABSTRACT OF THE DISCLOSURE

A structural system comprised of a number of interconnected points in space. The structural system includes a plurality of interconnected modules, each having two sets of legs, the legs of each set being joined at a common terminus. The physical relationships between the two sets of legs of each module being constant while the physical relationships between the legs of each set in a given module being variable to permit selective geometrical composition of the module to compose any of a number of different configurations in the structure.

---

This invention relates to the distribution of points in space, the interconnection of which in a number of varying ways, defines a structural system.

It is a primary object of the instant invention to provide a geometrical, modular structure, each module comprising two sets of legs, the relationships between the first and second set of legs of each module remaining constant while the relationships between the legs of each set in a given module are variable to permit selective geometrical composition of the module to compose any of a number of distinct configurations to satisfy any one of a variety of purposes.

Another object of the invention is to provide a geometrical structure which can be used either as a supporting building component or the aesthetic appearance purposes such as a decorative wall or panel.

It is another object of the invention to provide a geometrical structure comprised of interconnected modules wherein the modules locate a number of interconnected points in space, said points defining one or more surfaces of the structure.

A still further object of the present invention is the provision of a structural assembly of the foregoing type wherein changes in the relative dispositions of the various legs or lines of interconnection between the points in space can be made as desired so that the over-all configuration of the assembly can be varied accordingly.

In the drawings:

FIGURE 1 is a fragmentary, perspective view of one embodiment of a geometrical structure of the invention having a series of modules each comprised of a pair of three-legged units;

FIG. 2 is a top plan view of one of the modules forming the structure in FIG. 1, and illustrating the way in which the configuration of the structure can be varied by changing certain components forming the module;

FIG. 3 is a view similar to FIG. 2 but illustrating a second form of a module comprised of a pair of three-legged units;

FIG. 4 is a perspective view of a structure utilizing a series of modules of the type shown in FIG. 3;

FIGS. 5–9 are schematic representations of five different modules which can be utilized for forming the first and second forms of the instant invention, FIGS. 5 and 8 illustrating schematically the modules of FIGS. 2 and 3;

Figure 10:
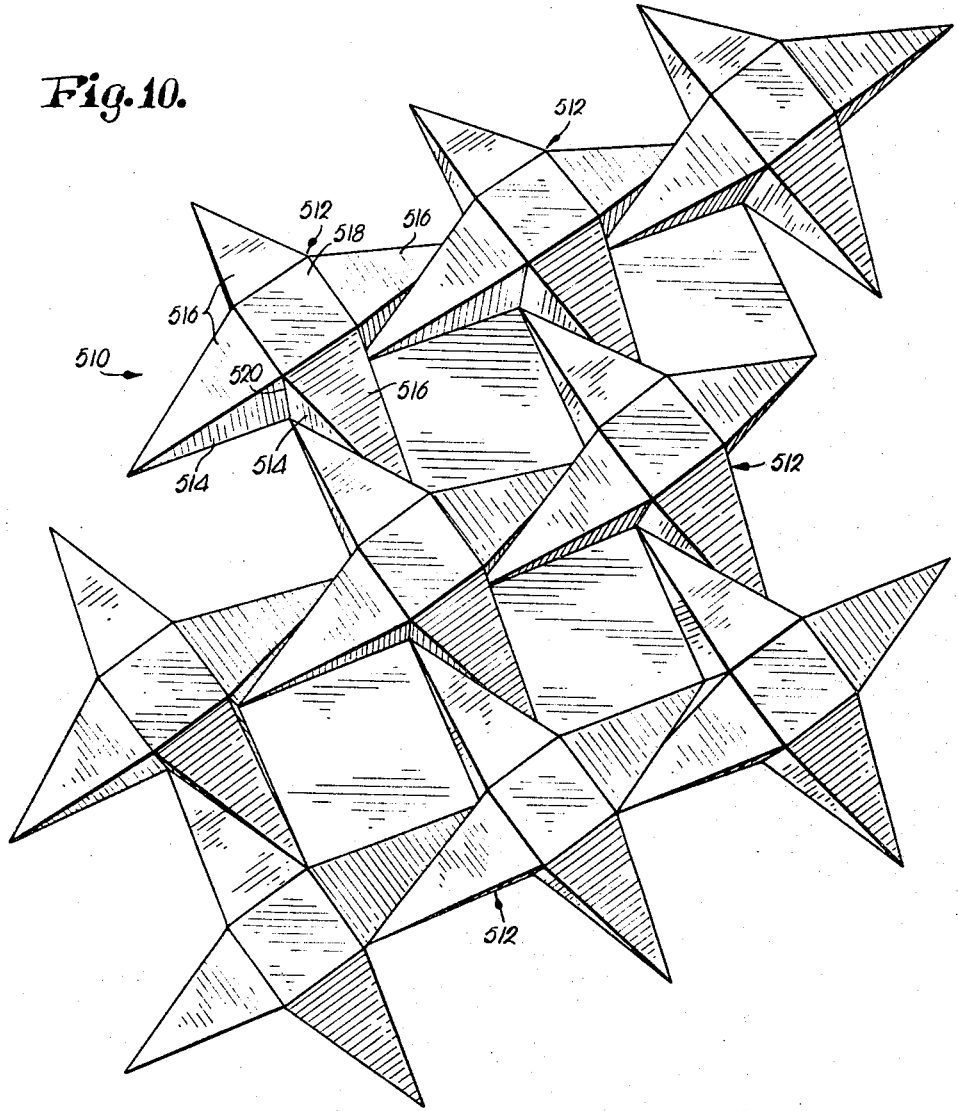
FIG. 10 is a fragmentary, perspective view of a third form of a geometrical structure of this invention utilizing a series of modules each comprised of a pair of four-legged units.

The present invention provides a geometrical structure which, in each of its various forms, is constructed from a series of interconnected, 3-dimensinal, identical modules, each module having as a basic part a pair of multi-legged units, the legs of the units of each module being angularly disposed with respect to each other and extending outwardly from a common terminus in respective directions. The legs of each of such units may have any one of a number of different shapes and have different relative angular dispositions so that the distinct design of the over-all structure is not limited to a single configuration. Moreover, the modules may be formed from an initially flat sheet of bendable, relatively self-sustaining material, or can be formed from a series of elongated, interconnected, rigid members such as rods or other similar devices which define an open framework. Manifestly, such a framework can be covered with sheet material or the like if desired.

Initially, the legs of each module are coupled to a common terminus and are swingable relative to each other and to the terminus so that the over-all configuration of the structure formed by the various modules can be selectively changed, depending upon the size and configuration of the space with which the structure is associated. After the configuration of the structure is selected, means is provided for fixing the legs with respect to each other so as to render the structure substantially rigid. Changes in the configuration of the structure can be made by altering the leg-fixing means, if desired.

One form of the geometrical structure of the present invention, denoted by the numeral 10, is illustrated in FIG. 1 and includes a series of substantially identical, interconnected modules 12 which are repeated throughout structure 10 to provide the configuration of the structure. For purposes of illustration, structure 10 in FIG. 1 has been formed from an initially flat sheet of bendable or foldable, relatively self-sustaining material. The sheet has been folded along a plurality of lines to define modules 12, each module 12 being defined by three pairs of angularly disposed plane sheet sections 14, each of which is triangular in configuration. Each pair of sections 14 defines a first line 16 which is the line of bend or fold therebetween. Line 16 has one end at the terminus 18 of a pair of second, relatively convergent lines 20 at proximal extremities of the aforesaid pair of sections 14. Line 16 lies along the longest side of each of the sections 14; whereas, line 20 lies along the shortest side of the corresponding section 14. Each line 20 is common to a pair of sections 14 as is illustrated in FIG. 2, each line 20 being defined by the line of bend or fold between the adjacent sections 14.

All of the lines 16 and 20 extend outwardly from terminus 18 in respective directions, adjacent lines 16, as well as adjacent lines 20, with one of the lines 20 being disposed substantially midway between, but normally out of the plane of each pair of adjacent lines 16.

The portions of the sheet which form lines 16 define a first tripod unit whose three legs lie along lines 16 and are joined together at terminus 18. Similarly, the portions of the sheet forming lines 20 define a second tripod unit having legs extending along lines 20 and interconnected at terminus 18. The legs of the tripod units of one module are coupled with the legs of the tripod units of adjacent modules so that structure 10 has a basic construction and one that is repeated throughout its expanse. In this respect, each of the legs extending along lines 16 of one module is coupled at its outer end at junction 19 to the outer end of one of the legs corresponding to lines 20 of an adjacent module. Thus, a long leg of one module is coupled to a short leg of an adjacent module. Moreover, the six legs of each module 12 are coupled with corresponding legs of different adjacent modules, i.e., no two legs of any one module are coupled to the same adjacent module. As shown in FIG. 1, each line 16 of one module 12 joins a corresponding line 20 of an adjacent module and is angularly disposed with respect thereto. Lines 16 are all of the same length and the lines 20 are all of the same length.

Since the sheet from which structure 10 is formed is bendable, the sections 14 of each pair may move toward and away from each other about the common line 16. Such movement results in moving the outer ends of the corresponding lines 20 at junctions 19 toward and away from each other. Moreover, such shifting of sections 14 results in swinging line 16 through an angle about terminus 18.

The external configuration of structure 10 can be varied by manipulating modules 12 so that the junctions 19 are at various spacings with respect to each other. FIGURE 1 illustrates a disposition of the points in space defined by the ends of the respective lines 16 and 20 wherein the uppermost portion of structure 10 defined by the loci of junction 19 is dome-shaped and the lower portion of structure 10 is flared outwardly by virtue of the loci of the proximal junctions to define a substantially flat surface. Configurations of structure 10 other than that shown in FIG. 1 can be obtained by manipulating modules 12 in various ways, whereby the spacings between junctions 19 vary to increase or decrease the size of the respective modules 12. This is illustrated in FIG. 2 wherein a module 12 is shown in a first condition in the full lines, and in a second expanded or enlarged condition in dashed lines.

To maintain module 12 in the first condition, three rod-like connector elements 22 may be interconnected at their respective ends to respective outer ends of adjacent lines 20 at junctions 19 to prevent relative movement of lines 20 with respect to each other and thereby fix the size of module 12. However, if it is desired to enlarge or expand module 12, elements 22 are removed and lines 20 are thereby free to swing with respect to terminus 18 away from each other until junctions 19 assume positions at which the lines 24 defining the third sides of sections 14 lie along dashed lines 26.

Connector elements 22 of greater lengths shown in dashed lines in FIG. 2 may then be utilized to once again fix lines 20 with respect to each other and thereby establish the configuration or shape of the corresponding module 12. By expanding or enlarging module 12, a dome-shaped configuration is obtained for structure 10; whereas, by contracting or decreasing the size of module 12, a flattened or flared-out configuration is provided for structure 10. It is conceivable that elements 22 may be removably secured to the outer ends of lines 20 so that the corresponding module 12 may be increased or decreased in size to permit variations in the configuration of structure 10. In the event that a module 12 expands, the the outer portions of the sheet surrounding module 12 will assume the dashed-line position denoted by the numeral 28 shown in FIG. 2. Once the connector elements 22 are coupled to the proper locations on the various modules 12, the resulting geometrical structure is 3-dimensional, monolithic and of a basic modular design throughout.

It should be pointed out at this juncture that, to this point in the specification, structure 10 has been described as being defined by the loci of the outer ends of lines 20, i.e., junctions 19. It will be recognized that another structure is defined by the loci of the termini 18. Although the structure defined by termini 18 bears a relationship to the structure defined by junctions 19, the surface defined by termini 18 is spaced from the surface defined by junctions 19 and can be considered an inner surface. Similarly, it should be understood that the network of lines 16 and lines 20 define a structure which can be considered separately from the termini 18 and junctions 19. The structure so defined by lines 16 and 20 could be interconnected as by rods 22 to form a rigid, self-supporting structural component or decorative unit.

Thus, structure 10 represents the interconnection of a plurality of distributed points in space and the components of each module 10 provide compressive and tensile units which, when cooperating with the components of adjacent modules 12, forms the structural system defined by geometrical structure 10. It is to be noted that the systematic movement of structure 10, and the distribution of the plurality of points in space defined thereby, are coordinated and controlled by the two tripod units of each module 12 respectively. The control provided by the tripod units arises by the selective dispositions of the legs of the tripod units, all of which legs are fixed in space by elements 22.

Schematically, the basic module 12 of structure 10 shown in FIG. 1 is illustrated in FIG. 5 wherein legs 16a represent the legs of the first tripod unit, and legs 20a represent the legs of the second tripod unit. Legs 16a and 20a extend outwardly from a common terminus 18a and, although not shown, the outer ends of legs 16a are coupled to the outer ends of corresponding legs 20a of adjacent modules; whereas, the outer ends of legs 20a of the one module shown in FIG. 5 are coupled to the outer ends of corresponding legs 16a of adjacent modules.

Connector elements 22 may be coupled with the outer ends of lines 16 in lieu of their being coupled to the outer ends of lines 20. In either case, the configuration of the corresponding module 12 would be fixed.

In lieu of utilizing a bendable, relatively self-sustaining sheet to form structure 10, the latter may be constructed by the use of elongated structural members, such as rods or the like. These rods would be disposed in the same positions as lines 16 and 20 of FIGS. 1 and 2. A connector of suitable configuration at each terminus 18 would be required to pivotally interconnect the six corresponding rods together, while at the same time permitting swinging movement of the rods relative to the connector so as to permit variations in the configuration of the resulting structure.

A structure formed with rods or other structural members in this manner would present an open framework and the sections 14 would be open space bounded by the rods. The framework could include connector elements 22 which would fix the configuration of the framework by preventing relative movement of the rods or structural members corresponding to lines 20. Since the resulting completed framework would necessarily be open, the same could be covered either on the surface defined by the junctions 19 or the surface defined by the terminus 18 by a suitable material so as to provide a structure suitable for a variety of building or decorative purposes.

It is to be understood that if rods or other structural members are utilized in this manner, the lengths of the rods would remain the same throughout the entire structure, the only variation being the spacing between the outer ends of the rods corresponding to lines 20 which, in turn, are determined by the desired configuration of the resulting structure. The use of rods or similar structural members would permit movement of the over-all framework prior to the securing of the connector elements 22 in place. As a result, the structure may assume any one of a number of different configurations so as to be suitable for use in spaces of irregular shapes and sizes.

A second form of the instant invention is illustrated in FIG. 4 and includes a geometrical structure 110 having a series of interconnected, identical modules 112 throughout which determine the configuration of structure 110 by the selective positioning of various components of modules 112 with respect to each other.

The basic module used in structure 110 is illustrated in FIG. 3 and includes a first tripod unit having three legs 116 and a second tripod unit having legs 120. A hexagonal terminus 118 is provided with a side for each of the legs 116, as well as for each of the legs 120. Legs 116 and 120 extend outwardly from respective sides of terminus 118 in corresponding directions. As shown in FIG. 3, a leg 120 is disposed substantially midway between an adjacent pair of legs 116.

Structure 110, as illustrated in FIG. 4, is also formed from an initially flat sheet of bendable, relatively self-sustaining material which is folded or bent along a plurality of lines to define legs 116 and 120 of the various modules 112. Legs 116 and 120 are each rectangular in configuration and, therefore, defined by two pairs of parallel fold lines in the sheet. One of the fold lines of each of the legs 116 and 120 coincides with the respective side of terminus 118, the latter being substantially planar. As illustrated in FIG. 4, the fold line or junction 119 defining the outer end of each leg 120 of one module coincides with the fold line at the outer end of a leg 116 of an adjacent module. Thus, the outer ends of legs 116 of one module are interconnected with the corresponding outer ends of legs 120 of adjacent but different modules. As a result, the modules 112 are all interconnected to provide a monolithic construction for structure 110.

Upon careful comparison between FIGS. 1 and 4 of the drawing, it can be seen that structure 110 of FIG. 4 bears a number of similarities in modular construction with structure 10 of FIG. 1. Considering structure 10 of FIG. 1, if lines 16 were spread to define rectangular areas such as legs 116, lines 20 spread to define rectangular areas such as legs 120 and the respective lines 20 also were terminated in spaced relationship to define the hexagonal terminus 118, the basic modular make-up of structure 110 of FIG. 4 would result. However, structure 110 is illustrated in FIG. 4 showing the reverse side of the structure from that shown in FIG. 1. Further, the relative positional relationships of the components of the modules of structure 110 are such as to provide convexity to the imaginary surface defined by the loci of the termini 118, whereas the positional relationships of the components of structure 10 are such that the imaginary surface defined by termini 18 is generally concave.

Legs 116 and 120 of each module 112 of FIG. 4 are effectively hinged to the corresponding terminus 118 so that the spacings between the outer ends of these legs can be varied. Thus, the interconnected modules 112 may be arranged in any one of a number of dispositions with respect to each other to permit variations in the configuration of structure 110. As illustrated in FIG. 4, structure 110 has a dome-shaped configuration, but it is to be understood that configurations other than that shown in FIG. 4 can be provided by varying the aforesaid spacings of legs 116 and 120. To establish the configuration of structure 110, connector elements 122 are utilized to interconnect the outer ends of legs 120 in the manner shown between legs 120 of each module 112 so that the latter cannot be increased or decreased in size.

To change the configuration of structure 110, connector elements 122 may be removed from the operative positions thereof shown in full lines in FIG. 3, and the basic module may then be increased or decreased in size, depending upon the configuration which is desired. As shown in FIG. 3, the module is shown in an enlarged condition in dashed lines and, in this case, connector elements 122 of greater lengths are required to once again fix the corresponding legs 120 with respect to each other and thereby prevent further increase or decrease in the size of the module.

The legs of one module 112 may be moved into new positions with respect to the legs of adjacent modules 112 inasmuch as the legs of one module are hingedly connected to corresponding legs of adjacent modules. Thus, the systematic movement of structure 110 prior to the use of elements 122 and the distribution of legs 116 and 120 in space can be selectively controlled to attain substantially any desired configuration for structure 110.

What has heretofore been pointed out with respect to structure 10 applies also with respect to structure 110 in that a structure is defined by the loci of termini 118, another by the loci of junctions 119 and still a third is defined by the legs 116 and 120.

When elements 122 fix legs 120 with respect to each other, the resulting structure 110 is 3-dimensional, monolithic and of modular design throughout its expanse. In all cases, the lengths of all legs 116 are identical and the lengths of all legs 120 are identical. Here again, by the use of a basic individual module throughout structure 110, numerous configurations can be obtained so that the structure of the instant invention is readily adaptable for use is spaces of irregular shapes and sizes.

In lieu of using a sheet to define the various modules 112, rods or other structural members could be employed to accomplish this purpose. If rods are used, the rods would form the sides and ends of legs 116 and 120 and necessarily would present terminus 118. Rigid strips having widths corresponding to the lengths of the sides and terminus 118 could also be utilized for this purpose.

Such structural members would present an open framework which, following the placement of connector elements 122 at the proper locations, could be covered with a suitable material to effectively close the openings in the framework as desired. In order to obtain the movement of the various legs of structure 110, the structural members would have to be pivotally interconnected to each other at their junctions so that before the connector elements are coupled to legs 120, the configuration of structure 110 can be established. The lengths of the structural members would remain the same throughout the extent of structure 110, the only variation being the spacing between the structural members which define legs 120.

The basic module 112 is shown schematically in FIG. 8 with legs 116 extending outwardly from terminus 118 a greater distance than legs 120. The widths of legs 116 and 120 are the same so that the outer ends of legs 116 of one module correspond in width to the outer ends of legs 120 of adjacent modules. Indeed, it should be noted that the widths of any legs of all forms of the invention are equal to the widths of the corresponding legs at the points of connection between adjacent modules.

Other tripod leg configurations are shown schematically in FIGS. 6, 7 and 9 and illustrate how the basic module design formed from a pair of tripods can be varied without departing from the scope of the invention. In FIG. 6, module 212 includes a triangular terminus 218 common to three triangular legs 216 of a first tripod unit, as well as three legs 220 of a second tripod unit, legs 220 being different in configuration from legs 216.

Each leg 216 has a base which coincides with a corresponding side of terminus 218. Each leg 220 has an end which coincides with the junction between a pair of adjacent sides of terminus 218. Appropriate hinging action between terminus 218 and legs 216 and 220 would be required to permit movement of the structure resulting from the interconnection of a series of modules of the type shown in FIG. 6, the outer ends of legs 220 being adapted to be intercoupled with three connector elements in the foregoing manner to fix the dispositions of legs 220 and thereby the configuration of the structure formed thereby.

In FIG. 7, another basic tripod module 312 is shown wherein the terminus 318 thereof is triangular and includes three triangular legs 316 of a first tripod unit and three legs 320 of rectangular configuration of a second tripod unit. The apexes of legs 316 are joined as respective junctions between adjacent discs of terminus 318 and, legs 320 have ends which are common to respective sides of terminus 318. Hinging action between the terminus 318 and legs 316 and 320 would be required to permit movement of the structure formed by a series of the basic module.

Still another basic module 412 of the type shown in FIG. 9 could be utilized in forming a structure of the type described. Module 412 is similar to the basic module 112 except that legs 416 and 420 thereof are trapezoidal rather than being rectangular. Once again, a hexagonal terminus 418 is provided for and is common to the legs 416 and 420 of the tripod units of module 412.

The legs and terminus of each of the modules 212, 312, and 412 can be formed by the use of an initially flat sheet as in the manner of forming structures 10 and 110, or, structural members such as rods or strips would be used in lieu of sheet materials. In all cases, means would necessarily be provided to permit pivoting or swinging of the legs relative to the terminus to thereby permit movement of the structure formed by a series of such modules.

The foregoing description has been with respect to geometrical structures having a basic module provided with a pair of tripod units. The following description relates to geometrical structures having basic modules which are comprised of units having more than three legs.

Figure 12:
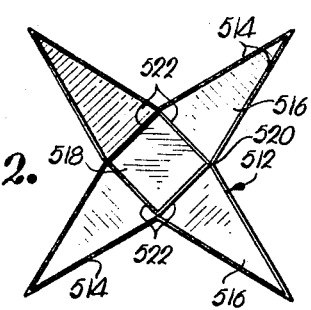
FIG. 12 is a bottom plan view of the module of FIG. 11.
Figure 11:
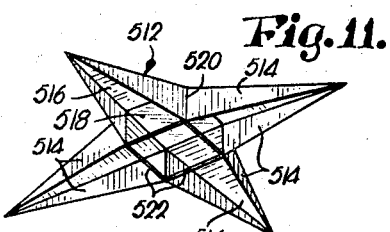
FIG. 11 is a perspective view of one of the modules forming the structure of FIG. 10.

As a first example of this construction, reference is had to FIGS. 10-12 wherein a geometrical structure 510 is illustrated, structure 510 having a series of intreconnected modules 512 of identical construction. Each module 512 is provided with a terminus 518, a first set of legs 516, and a second set of legs 520. For purposes of illustration, structure 510 has been formed from an initially flat sheet of bendable material. However, it is to be understood that structure 510 could be comprised of a number of rod-like members defining an open framework, the members being arranged along the extremities of legs 516 and along the legs 520.

As shown in FIG. 10, each leg 516 is triangular and each leg 520 is defined by a fold line between a pair of triangular sections 514 integral with the adjacent legs 516. Legs 516 extend outwardly from and at an angle with respect to the corresponding terminus 518. Similarly, legs 520 extend outwardly from and at an angle with respect to terminus 518, depending upon the relative dispositions of the corresponding sections 514.

The outer extremity of each leg 516 of one module is interconnected to the outer extremity of a corresponding leg 520 of an adjacent module 512. Thus, a long leg of one module 512 is coupled with a short leg of an adjacent module 512. This construction is repeated throughout so that structure 510 has an appearance when viewed from the top which is distinctive from the appearance when viewed from beneath. FIGURE 11 illustrates the view of one of the modules viewed from beneath or the reverse of the view illustrated in FIG. 10.

To render modules 512 stationary with respect to each other, connector elements 522 are provided to interconnect the outer extremities of legs 520 of each module 512. There will be four connector elements 522 corresponding in number to the legs of each of the pair of units defining module 512. Variations in the lengths of elements 522 will determine the configuration of structure 510. Legs 516 and 520 are, in effect, hingedly mounted to the corresponding terminus 518 so that different configurations of structure 510 may be attained. Moreover, the configuration of structure 510 may be changed if desired, by replacing elements 522 with other elements of different lengths.

Figure 13:
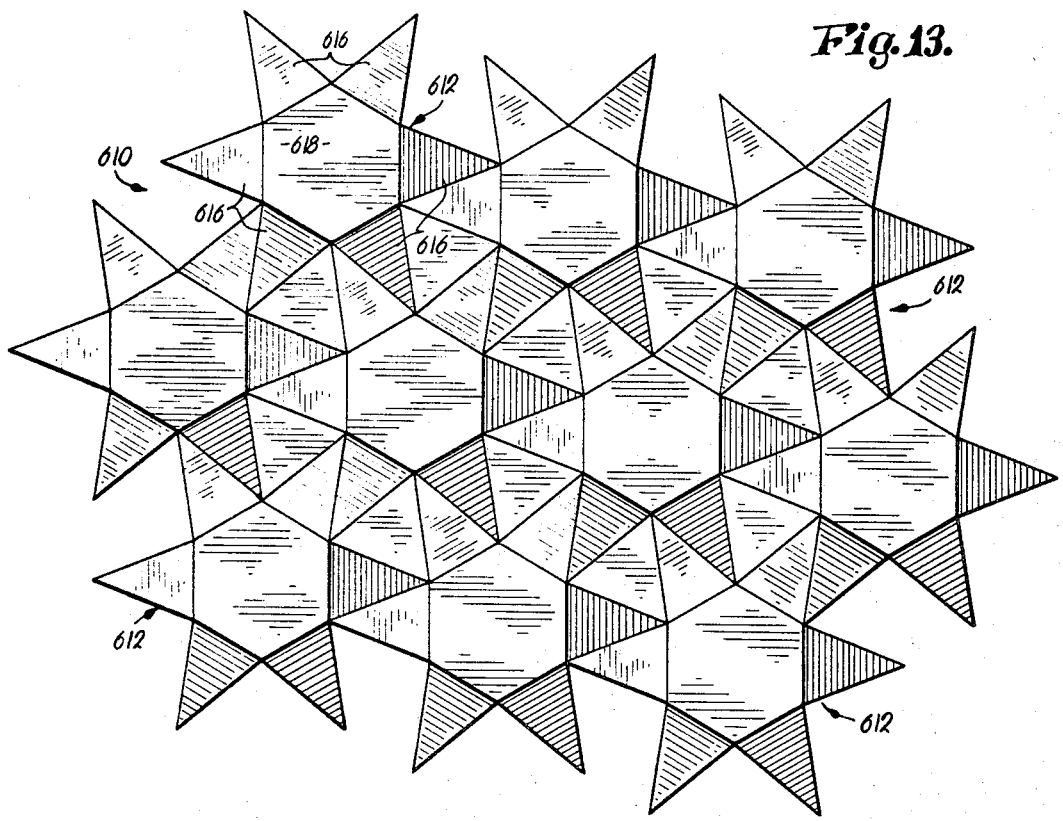
FIG. 13 is a fragmentary plan view of a fourth form of the invention utilizing a series of modules each comprised of a pair of six-legged units.
Figure 15:
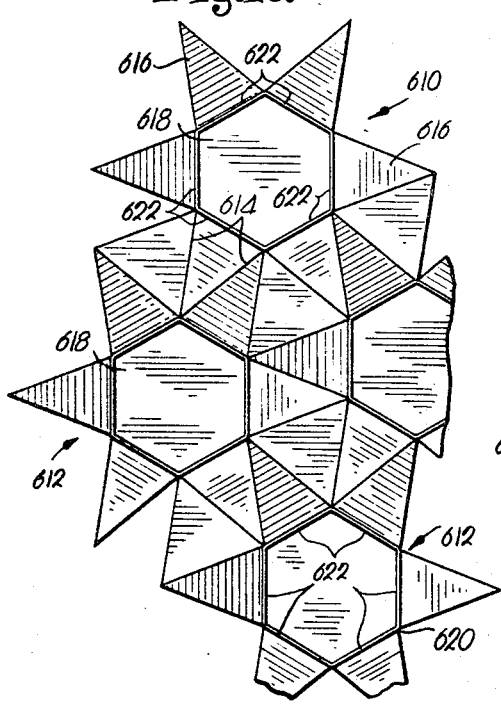
FIG. 15 is a bottom plan view of a portion of the structure shown in FIG. 13.
Figure 14:
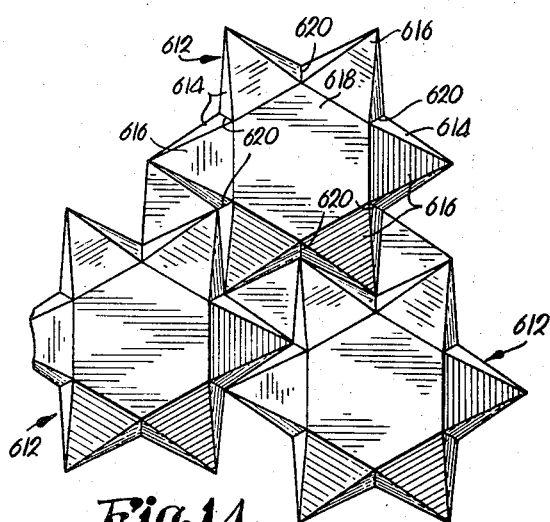
FIG. 14 is a view of the form shown in FIG. 13 with the units thereof in an expanded condition.

FIGS. 13-15 illustrate a geometrical structure 610 having a series of interconnected, basic modules 612, each comprised of a pair of six-legged units. FIG. 13 illustrates the plan view of structure 610, FIG. 14 illustrates structure 610 in an expanded condition, and FIG. 15 illustrates the side of structure 610 opposite to that shown in FIGS. 13 and 14. As shown in FIG. 14, each module 612 has a hexagonal terminus 618, a first set of triangular legs 616, and a second set of legs 620, there being a leg 620 between each pair of adjacent legs 616. Here again, legs 620 are formed by the fold lines defined between adjacent triangular sections 614, it being understood that structure 610 is formed from an initially flat sheet of bendable material in the manner described above. Legs 616 and 620 are hinged to terminus 618 of the corresponding module 612 so that different configurations may be attained for structure 610.

To fix modules 612 with respect to each other and thereby define the specific configuration of structure 610, a number of connector elements 622 are provided, there being six elements 622 for each module 612 respectively. As shown in FIG. 15, elements 622 interconnect the outer ends of legs 620 of each module 612 whereby such legs are held against movement with respect to each other. Interconnecting legs 620 in this manner renders structure 610 substantially rigid throughout so that it will retain its configuration. As set forth above, the configuration of structure 610 may be changed by altering the lengths of elements 622.

It is conceivable that legs 616 and 620 may be of other shapes than those illustrated in FIGS. 13-15. In interconnecting adjacent modules 612, the outer extremity of each leg 616 is pivotally interconnected with the outer extremity of a corresponding leg 620 of an adjacent module 612. This is illustrated clearly in FIG. 14. In this case, legs 616 and 620 each extend radially outwardly from the corresponding terminus 618, but also is disposed at an angle with respect thereto.

Figure 16:
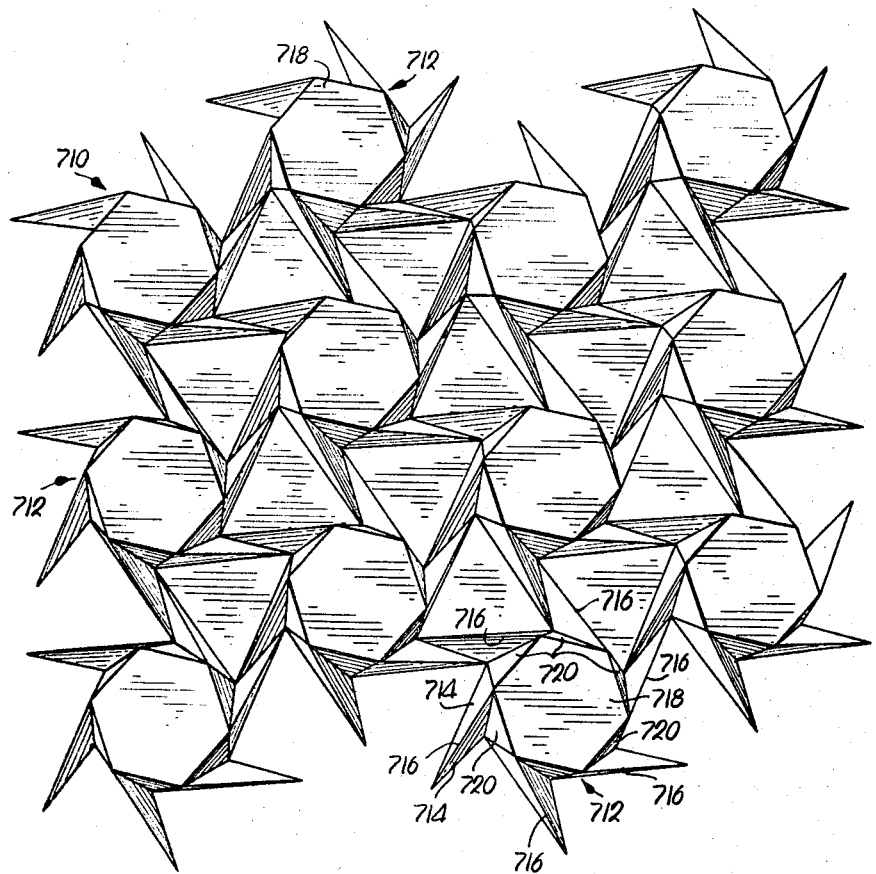
FIG. 16 is a fragmentary, perspective view of another form of the invention similar to the form of FIGS. 13–15 in that it utilizes a series of modules each having a pair of six-legged units, but with the legs of one of the units being oriented in a different manner from the legs of the units of the form of FIGS. 13–15.
Figure 17:
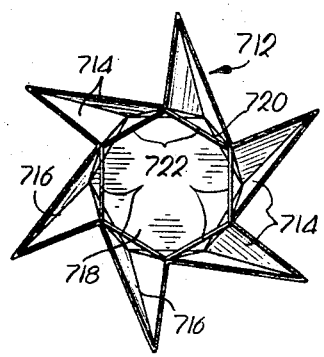
FIG. 17 is a bottom plan view of one of the modules of FIG. 16.

Another geometrical structure based on a module having a pair of six-legged units is illustrated in FIGS. 16 and 17 and is denoted by the numeral 710. Structure 710 is comprised of a plurality of interconnected modules 712, each having a hexagonal terminus 718, a first set of legs 716 and a second set of legs 720, there being a leg 720 between each pair of adjacent legs 716. Legs 720 extend radially outwardly from the corresponding terminus 718 and also are disposed at an angle with respect to the plane of its terminus 718. However, legs 716 not only extend outwardly from and at an angle with respect to terminus 718, but also such legs extend in a direction tangential to the periphery of the corresponding terminus 718. Thus, structure 710 differs in construction from structure 610.

Each leg 716 is defined by the fold line between a pair of triangular sections 714 which extend outwardly from terminus 718. Each leg 720 is triangular and is hinged, like each leg 716, to the corresponding terminus 718. Thus, the configuration of structure 710 may be varied as desired and, to fix a desired configuration, connector elements 722 are provided, there being six elements 722 for each module 712 respectively. As shown in FIG. 17, elements 722 interconnect the outer extremities of adjacent legs 720. It is to be understood that, in lieu of interconnecting legs 720, the outer extremities of adjacent legs 716 could be interconnected by elements similar to elements 722. To change the configuration of structure 710, the lengths of elements 722 are varied, this being accomplished, of course, by replacing elements 722 with longer or shorter elements. It is conceivable that legs 716 and 720 could have other shapes without departing from the scope of the invention.

The size of each basic module of each of the foregoing geometrical structures can be selected to accomplish a specific purpose, i.e., the lengths of the legs of each of the modules are not limited to specific values. Moreover, basic modules other than those illustrated in the drawings could be utilized without departing from the scope of the invention. The modules disclosed herein are illustrative only and are not to be taken as limiting the manner in which the geometrical structure of the invention can be formed.

It will be readily apparent to those skilled in the art that the components of the basic modules of the structures formed pursuant to the principles of this invention need not be oriented precisely as illustrated in the drawings forming a part of this application. An attempt has been made to simplify the description of this invention and, to achieve this simplicity, certain arbitrary fundamentals with respect to orientation of the module components have been repeated throughout.

However, it is pointed out that the points of intersection of the legs, rods or lines of the various modules, being pivotally interconnected, can, prior to fixing by the aforementioned fasteners, all be shifted or relocated in a predictable geometric relationship simply by moving or "rotating" one of the components of a module from the position thereof chosen for illustration in the drawings. Such reorientation of the components results in a redistribution in space of the various "points" defined by the termini of the components of the modules, however it will be recognized that the resulting modules bear definite relationship to the basic modules illustrated in the drawings. A more complete understanding of the reorientation of the components of the modules in this manner to define new positional relationships between the various components may be had by referring to my U.S. Patent No. 3,201,894 entitled Geometrical Device Having Articulated Relatively Movable Sections. The disclosures of that patent, insofar as they may become necessary for a full and complete understanding of this invention, are incorporated herein by reference.

Although the aforementioned patent refers only to two-dimensional modules, those skilled in the art will readily understand that the principles of the patent may be applied to three-dimensional constructions such as are embraced by the instant invention. Recognizing that new and different modules may thus be derived through such reorientation of the components, it can be seen that suitable ties or connectors which, however, may be of varying lengths can be applied to the components for locking the modules in the desired positions. The resulting geometrical structures will be 3-dimensional, monolithic and of basic modular design throughout.

Having thus described the invention, what is claimed as new and desired to be secured by Letters Patent is:

1. In a geometrical structure:
a series of interconnected modules each having a pair of units provided with a common terminus, each unit being provided with a number of legs extending outwardly from said terminus in respective directions, there being a leg of a first of said units between a pair of adjacent legs of the second unit, the positions and dimensions of the legs of said first unit being invariable relative to the positions and dimensions of the legs of said second unit in the module, and the physical relationships between the legs of each unit being selectively variable to permit composition of the module into any of a number of distinct configurations, said legs of the units of each module being interconnected with legs of the units of adjacent modules to join said terminuses.

2. A geometrical structure as set forth in claim 1, including means coupled with at least a number of said modules for holding the legs thereof against movement relative to the corresponding terminus.

3. In a geometrical structure:
a series of interconnected modules, each of said modules being comprised of a first unit having a number of angularly disposed legs of a first dimension, and a second unit having said number of angularly disposed legs of a second dimension, the legs of said units having a common terminus and extending outwardly from the latter in respective directions, there being a leg of the second unit between a pair of adjacent legs of the first unit, each leg of the first unit of one module being coupled to a corresponding leg of the second unit of an adjacent module, each leg of the second unit of said one module being coupled to a corresponding leg of the first unit of an adjacent module each leg being swingable relative to said terminus.

4. In a geometrical structure:
a series of interconnected modules, each of said modules being comprised of a first unit having a number of angularly disposed legs of a first dimension, and a second unit having said number of angularly disposed legs of a second dimension, the legs of said units having a common terminus and extending outwardly from the latter in respective directions, there being a leg of the second unit between a pair of adjacent legs of the first unit, each leg of the first unit of one module being coupled to a corresponding leg of the second unit of an adjacent module, each leg of the second unit of said one module being coupled to a corresponding leg of the first unit of an adjacent module, each leg being pivotally mounted at one end thereof to the corresponding terminus and coupled at the opposite end thereof to the corresponding leg of an adjacent module.

5. In a geometrical structure as set forth in claim 4, wherein said opposite end of each leg is hingedly mounted to the corresponding leg of an adjacent module.

6. In a gometrical structure:
a series of interconnected modules, each of said modules being comprised of a first unit having a number of angularly disposed legs of a first dimension, and a second unit having said number of angularly disposed legs of a second dimension, the legs of said units having a common terminus and extending outwardly from the latter in respective directions, there being a leg of the second unit btween a pair of adjacent legs of the first unit, each leg of the first unit of one module being coupled to a corresponding leg of the second unit of an adjacent module, each leg of the second unit of said one module being coupled to a corresponding leg of the first unit of an adjacent module, each leg of one module being coupled with the leg of an adjacent module different from the adjacent modules to which the other legs of said one module are coupled.

7. In a geometrical structure as set forth in claim 3, wherein is included an initially flat sheet of bendable, relatively self-sustaining material, said sheet being bent along a plurality of lines to form said modules with the legs of said modules being defined by the lines of bend of said sheet.

8. In a geometrical structure as set forth in claim 3, wherein each leg includes an elongated member, and wherein is provided means for connecting the ends of each member to the corresponding terminus and to the end of a member of an adjacent module.

9. In a geometrical structure as set forth in claim 3, wherein the longitudinal axis of the legs of each unit are separated by an arcuate distance of 120°.

10. In a geometrical structure as set forth in claim 3, wherein each leg of the second unit of each module is substantially midway between and normally out of the plane of the adjacent pair of legs of the first unit of the module.

11. In a geometrical structure:
a series of interconnected modules, each of said modules being comprised of a first unit having a number of angularly disposed legs of a first dimension, and a second unit having said number of angularly disposed legs of a second dimension, the legs of said units having a common terminus and extending outwardly from the latter in respective directions, there being a leg of the second unit between a pair of adjacent legs of the first unit, each leg of the first unit of one module being coupled to a corresponding leg of the second unit of an adjacent module, each leg of the second unit of said one module being coupled to a corresponding leg of the first unit of an adjacent module, each unit of each module having three legs.

12. A geometrical structure as set forth in claim 11, wherein the legs of the first and second units of each module converge to a common point, said point defining said terminus.

13. A geometrical structure as set forth in claim 11, wherein said terminus is triangular, the legs of the first unit being triangular, the legs of the second unit having a configuration different from that of the legs of the first unit.

14. A geometrical structure as set forth in claim 11, wherein said terminus is triangular, the legs of the first unit being rectangular, the legs of the second unit being triangular.

15. A geometrical structure as set forth in claim 11, wherein said terminus is hexagonal, each of the legs of said first and second units being rectangular.

16. A geometrical structure as set forth in claim 11, wherein said terminus is hexagonal, each of the legs of said first and second units being trapezoidal.

17. In a geometrical structure as set forth in claim 3, wherein each unit of each module has six legs.

18. In a geometrical structure as set forth in claim 17, wherein said terminus is hexagonal, the legs of said first unit being triangular, the legs of said second unit having a configuration different from that of the legs of the first unit.

19. In a geometrical structure as set forth in claim 17, wherein the legs of said units extend radially outwardly from said terminus.

20. In a geometrical structure as set forth in claim 19, wherein the legs of one of the units extend radially outwardly from said terminus and the legs of the other unit extend outwardly from said terminus at a predetermined angle with respect thereto.

21. In a geometrical structure:
a series of interconnected modules, each of said modules being comprised of a first unit having a number of angularly disposed legs of a first dimension, and a second unit having said number of angularly disposed legs of a second dimension, the legs of said units having a common terminus and extending outwardly from the latter in respective directions, there being a leg of the second unit between a pair of adjacent legs of the first unit, each leg of the first unit of one module being coupled to a corresponding leg of the second unit of an adjacent module, each leg of the second unit of said one module being coupled to a corresponding leg of the first unit of an adjacent module, each unit of each module having four legs.

22. In a geometrical structure as set forth in claim 21, wherein said terminus is square, the legs of said first unit being triangular, the legs of the second unit having a configuration different from that of the legs of the first unit.

23. A geometrical structure comprising:
a series of interconnected modules, each of said modules being comprised of a first unit having three angularly disposed legs of a first length and a second unit having three angularly disposed legs of a second length, the legs of said units having a common terminus and being pivotally secured thereto, said legs extending outwardly from the terminus in respective directions, there being a leg of the second unit between a pair of adjacent legs of the first unit, each leg of the first unit of one module being coupled to a corresponding leg of the second unit of an adjacent module, each leg of the second unit of said one module being coupled to a corresponding leg of the first unit of an adjacent module; and
means coupled with each of at least a number of said modules for holding the legs thereof against movement relative to the corresponding terminus.

24. A geometrical structure as set forth in claim 23, wherein said holding means interconnects the outer ends of the legs of one of said units.

25. A geometrical structure as set forth in claim 23, wherein the holding means corresponding to one module is of a dimension different from that of the holding means corresponding to an adjacent module.

26. A geometrical structure as set forth in claim 23, wherein the holding means corresponding to each module includes three elongated connector elements, each element spanning the distance between and being secured at the extremities thereof to the outer ends of a pair of adjacent legs of one of said units, the length of at least one of said three connector elements being different from the length of another of said elements.

27. A geometrical structure as set forth in claim 26, wherein the length of the legs of each second unit is less than the length of the legs of the corresponding first unit, said connector elements being secured to respective outer ends of the legs of said first unit.

References Cited

UNITED STATES PATENTS

| 2,245,875 | 6/1941 | Rutherford | 46—16 |
| 2,682,235 | 6/1954 | Fuller | 52—81 |

FOREIGN PATENTS

| 211,523 | 10/1960 | Austria. |
| 1,379,636 | 10/1964 | France. |

FRANK L. ABBOTT, *Primary Examiner.*

C. G. MUELLER, *Assistant Examiner.*